July 5, 1927.
M. E. ROE
CASTER MECHANISM
Filed June 9, 1922
1,634,558
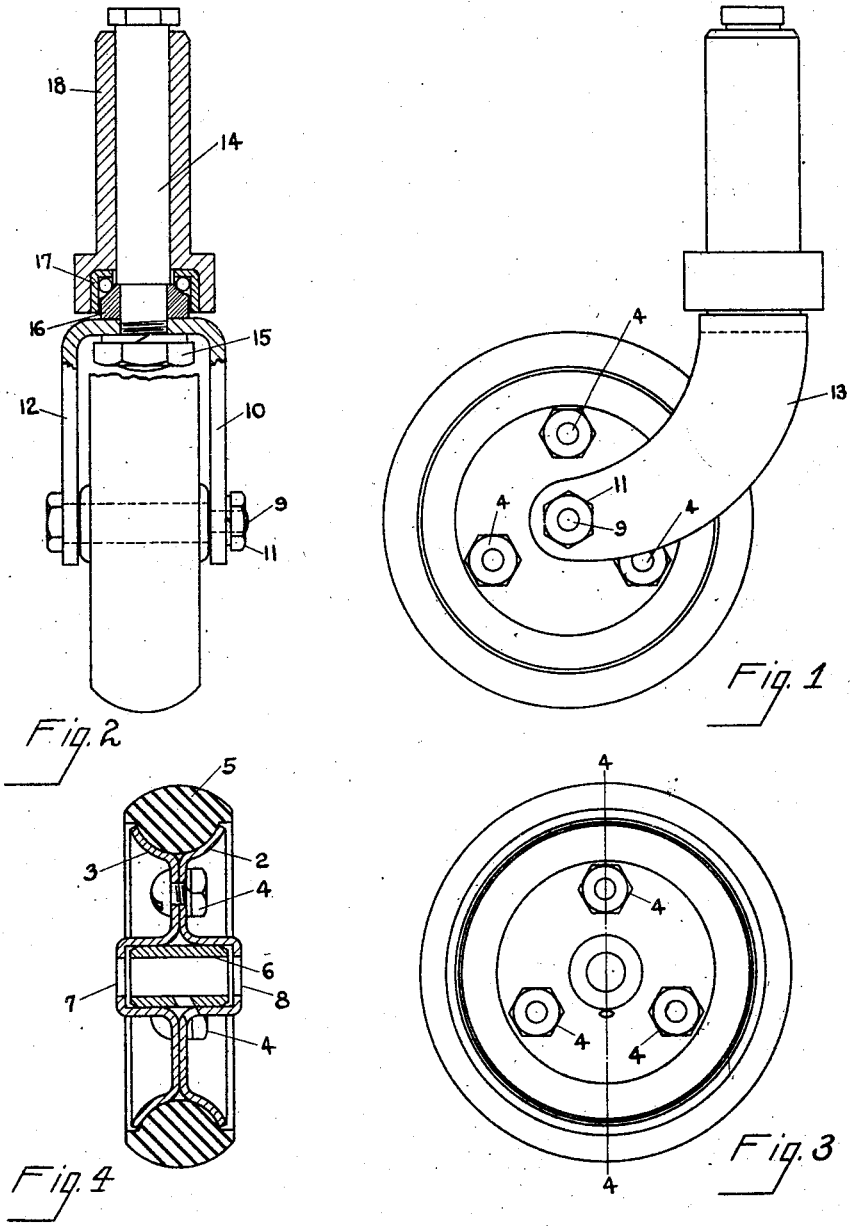
MAYO E. ROE INVENTOR.
BY Rickey, Slough + Watts.
HIS ATTORNEYS Patented July 5, 1927.

1,634,558

UNITED STATES PATENT OFFICE.

MAYO E. ROE, OF ELYRIA, OHIO, ASSIGNOR TO THE COLSON COMPANY, OF ELYRIA, OHIO, A CORPORATION OF OHIO.

CASTER MECHANISM.

Application filed June 9, 1922. Serial No. 566,925.

My invention relates more particularly to caster or roller devices for furniture and the like. Among the objects of my invention are the following—

To provide in combination a standard ball bearing, roller and stem, and a tubular bearing or adapter therefor;

To provide in a caster of the above character a construction such that the adapter is removable, whereby adapters of various sizes and shapes may be used in connection with any caster; also such a construction that all the parts are easily replaceable.

To provide a stem with a threaded terminal and a nut for securing the same to the fork of a caster which spans the roller;

To provide other details of improvement tending to increase the efficiency and serviceability of a device of the above character;

To accomplish the foregoing and other useful ends, my invention consists of means hereinafter more fully set forth and claimed.

Referring to the accompanying drawing—

Fig. 1 is a side elevation of the caster and adapter.

Fig. 2 is a front view showing the bearing and adapter in section.

Fig. 3 is a side view of the roller.

Fig. 4 is a section of the roller.

Referring more in detail to the accompanying drawing, it will be seen that the roller, Fig. 4, is made in two sections, 2 and 3, which are bolted together with suitable bolts 4. The sections 2 and 3 are in the form of stampings. When clamped together these sections form a peripheral groove in which the tire 5 of any suitable material is held.

The central portion of these sections 2 and 3 are cupped and when they are bolted together these cup sections form a chamber in which a tubular bearing 6 is held tightly clamped. It will be seen that the terminals of the tube 6 are located in juxta-position to the holes 7 and 8 in the central portions of the members 2 and 3. A bolt 9 serves as a shaft for the roller. This bolt is provided with a shoulder near the threaded end on the right, Fig. 2. This shoulder rests against the fork prong 10. The nut 11 is then used to clamp the bolt to the prong 10, thus holding the bolt tightly in position.

The bearing 6, it will be understood, rotates on the bolt 9. Of course, the object of the shoulder on the bolt 9 is to prevent the nut 11 from pinching the roller between the prongs 10 and 12 of the fork 13. In the upper portion of the fork 13 there is a hole through which the lower end of the stem 14 projects. This end of the stem is provided with suitable threads adapted to receive the nut 15. The stem also has a shoulder just above the threads against which the bearing cone 16 rests. The nut 15 serves to clamp the prong 13 and the cone 16 tightly in position as indicated in Fig. 2. Above the cone is the bearing cup 17 between which cup and the cone are the ball bearings. This cup is of hardened steel, and rests within the cup terminal found at the lower end of the adapter 18.

The adapter 18 is designed to fit into holes in the furniture to which the caster is to be attached. By varying the size and shape of the adapter 18, a standard caster may be used for pieces of furniture having holes of different sizes and shapes. With the construction shown, it will be seen that the weight of the furniture is received by the adapter 18, which latter transmits the weight of the cup 17, and thence through the ball bearing the pressure reaches the roller.

In order to insure that the bearing shall retain the proper upright position, and to insure against the tilting of the axis of the stem out of the vertical, I make the stem relatively long to assure a permanent alignment.

It will thus be seen that I provide a caster of new, and improved construction, highly efficient, economical to maintain, having a minimum number of parts and standardized so that it may be used in pieces of furniture in which caster receiving openings of different sizes and shapes are ordinarily intended to be used.

What I claim as my invention is—

1. In a caster, a wheel, a spanner fork for the wheel, a bearing for said wheel secured to said spanner fork, a thrust bearing on said spanner, a removable stem extending through said thrust bearing and said fork, said stem having a shoulder engaging the upper face of the thrust bearing, a nut removably threaded on to the end of said stem projecting through the spanner fork, said nut normally securing said stem to said spanner fork and securing the shoulder on said stem against said thrust bearing, a sleeve surrounding said stem, said sleeve having a shoulder at one end, balls between said sleeve shoulder and said thrust bearing, and an annular bearing intermediate said sleeve shoulder and said ball bearings.

2. In a caster, a wheel, a spanner fork for the wheel, a bearing for said wheel secured to the spanner fork, a thrust bearing on said spanner, a removable stem extending through said thrust bearing and said fork, said stem having a shoulder engaging the upper face of the thrust bearing, means removably secured to the end of the stem projecting through the spanner fork to normally secure the stem to the fork and the shoulder on the stem against the thrust bearing, a sleeve surrounding the stem, said sleeve having an enlarged bore at one end to form an annular recess about said stem, a liner of hardened material forming a bearing race for adjoining walls of the recess, bearing balls between the liner and said thrust bearing, said bearing balls disposed within a grooved portion of the thrust bearing and engageable with opposing angularly disposed surfaces of the liner.

3. In a caster, a wheel, a spanner fork for the wheel, a bearing for said wheel secured to the spanner fork, a thrust bearing on said spanner, a stem extending through said thrust bearing and said fork, said stem having a shoulder engaging the upper face of the thrust bearing, means secured to the end of the stem projecting through the spanner fork to normally secure the stem to the fork and the shoulder on the stem against the thrust bearing, a sleeve surrounding the stem, said sleeve having an enlarged bore at one end to form an annular recess about said stem, a liner of hardened material forming a bearing race for adjoining walls of the recess, bearing balls between the liner and said thrust bearing, said bearing balls disposed within a grooved portion of the thrust bearing and engageable with opposing angularly disposed surfaces of the liner.

In witness whereof, I have hereunto signed my name this 7th day of June, 1922.

MAYO E. ROE.